United States Patent [19]
Fletcher et al.

[11] 3,811,429
[45] May 21, 1974

[54] ARTERIAL PULSE WAVE PRESSURE TRANSDUCER

[76] Inventors: James C. Fletcher, Administrator of the National Aeronautics and Space Administration, with respect to an invention of; Chung Kim, Detroit, Mich.; Donald Gorelick; Wayne Chen, both of Silver Spring, Md.

[22] Filed: Sept. 25, 1972

[21] Appl. No.: 291,845

[52] U.S. Cl. .................... 128/2.05 E, 73/398 AR
[51] Int. Cl. .................................................. A61b 5/02
[58] Field of Search ..... 128/2.05 R, 2.05 P, 2.05 Q, 128/2.05 D; 73/398 AR, 71.5 U, 406

[56] References Cited
UNITED STATES PATENTS

| 3,090,377 | 5/1963 | Sausbury et al. | 128/2.05 E |
| 2,532,507 | 12/1950 | Meunier | 73/71.5 U |
| 3,447,378 | 6/1969 | Dunegan et al. | 73/406 X |
| 3,704,708 | 12/1972 | Iberall | 128/2.05 E |
| 2,549,049 | 4/1951 | Bierman | 128/2.05 E |
| 3,631,850 | 1/1972 | Levasseur | 128/2.05 E |
| 3,406,572 | 10/1968 | Robillard | 73/398 AR |
| 3,565,056 | 2/1971 | Statham | 128/2.05 D |
| 3,418,853 | 12/1968 | Curtis | 128/2.05 E |

FOREIGN PATENTS OR APPLICATIONS
1,294,914   4/1962   France ........................ 128/2.05 E

*Primary Examiner*—Aldrich F. Medbery
*Attorney, Agent, or Firm*—R. F. Kempf; John R. Manning

[57] ABSTRACT

A novel arterial pulse wave pressure transducer is disclosed, the transducer comprising a fluid-filled cavity having a flexible membrane member disposed over the cavity and adapted to be placed on the skin over an artery. An arterial pulse wave creates pressure pulses in the fluid which are transduced by a pressure-sensitive transistor disposed in direct contact with the fluid into an electric signal. The electrical signal is representative of the pulse waves and can be recorded so as to monitor changes in the elasticity of the arterial walls, and the like.

7 Claims, 1 Drawing Figure

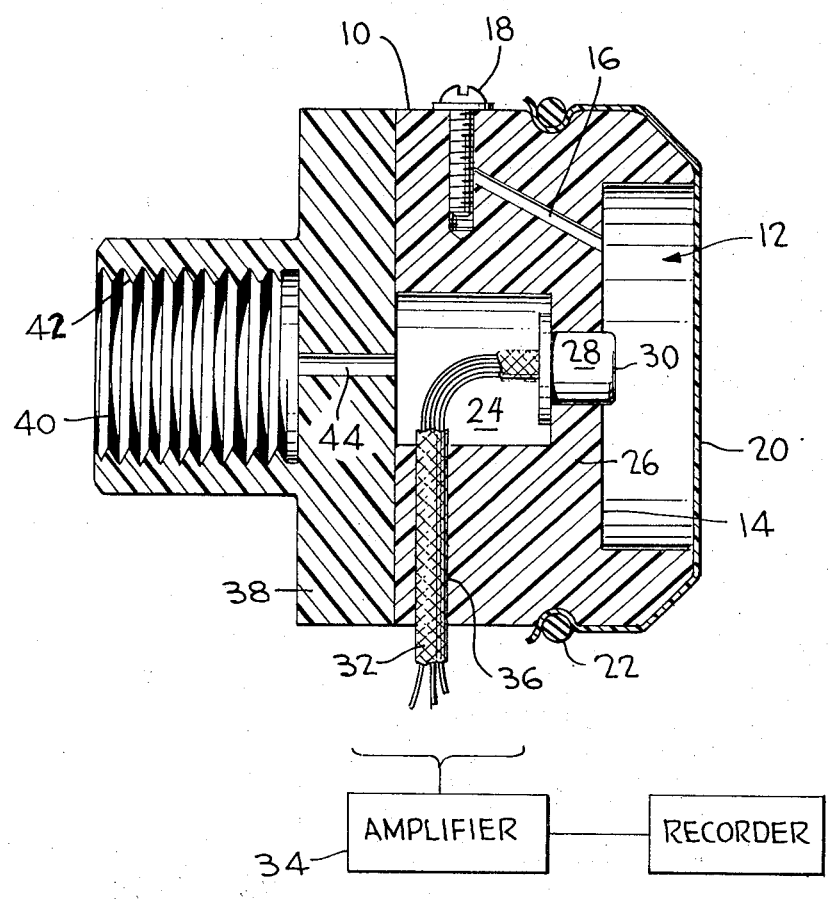

3,811,429

ARTERIAL PULSE WAVE PRESSURE TRANSDUCER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention generally relates to the medical arts and particularly concerns an arterial pulse wave pressure transducer capable of converting arterial pulse waves into electrical signals for subsequent recordation and study.

The medical arts have long recognized the need to measure arterial pulse wave forms as an indication of the functional status of the arterial wall, such as changes in the elasticity of the arterial walls associated with disease and/or aging.

In view of this recognized need, the prior art has developed a multitude of instrumentation capable of transducing and recording arterial pulse wave forms, such instrumentation operating both internally and externally of the patient. An example of an internal arterial pulse wave transducer includes those devices wherein penetration of the skin by means of a needle or the like through the arterial wall is effected, the pressure of the arterial pulse thereby being directly measured via a suitable transducer. Such internal techniques have not met with significant success, primarily due to the discomfort involved to the patient. Externally applied transducers do not involve this patient discomfort and, as such, show greater promise for increased utilization.

In this respect, presently available externally-applied arterial pulse wave transducers are capable of giving satisfactory measurements of arterial pulse waves, but, as a whole, suffer disadvantages in that they are difficult to produce in quantity and at a reasonable cost. In addition to the low cost requirement which would enable the utilization of such a transducer by virtually all physicians, numerous other requirements must be met for a commercially acceptable and reliable device. For example, a device of the type under consideration must have an essentially flat frequency response from 0 to 20 $H_z$ since the arterial pulse wave to be measured has useful information only in this range. A suitable externally-applied arterial pulse wave transducer must be sensitive to weak pulsations. In this respect, the signal from the artery is in the order of a pressure change of about 6 mmHg, which is a small pressure change necessitating an extremely sensitive transducer to measure.

A suitable arterial pulse wave transducer must further be compact enough and light enough so that it can be readily positioned on the various arteries of the patient. Such device must further be easy to apply to the patient.

Continuing, a suitable arterial pulse wave transducer must be such that the arterial wave form picked up is accurate enough and free enough from noise so that it will have sufficient clinical usefullness.

Considering these many requisites for a suitable externally-applied arterial pulse wave transducer, it is not surprising that the prior art in this area has met with relatively little success. In this respect, various strain gauge transducers have been utilized, which comprise a fluid-filled chamber and a stiff diaphragm to which a set of semiconductor strain gauges are cemented. While such strain gauge transducers are highly accurate, problems are presented in that the stiff diaphragm to which the semiconductor strain gauges are attached oftentimes bends out of shape in use, thereby rendering the device unsatisfactory.

Capacitive transducer systems have also been contemplated, yet such systems are highly complex and present problems similar to those of the diaphragm and strain gauge fabrication as above-discussed, such systems being relatively expensive to build. Piezo-electric transducer devices further are not acceptable in that the low frequency response thereof is quite limited.

Photoelectric transducer systems have also been contemplated yet, such systems are highly complex and require a highly accurate diaphragm to obtain effective results. The utilization of an electrolytic pressure transducer presents problems with respect to polarization of electrodes.

SUMMARY OF THE INVENTION

As is apparent, a need exists in the art for an improved externally-applied arterial pulse wave transducer which satisfies the above-enumerated requirements, and which does not present those disadvantageous features so typical with prior art approaches. It is a primary objective of the instant invention to provide such an improved transducer device which can satisfy this long felt need.

A further objective of the instant invention is the provision of an externally-applied arterial pulse wave pressure transducer which can be fabricated at a reasonably low cost, which is compact in size, and which is constructed in a fashion facilitating application to the skin of a patient.

Another objective of the instant invention concerns the provision of a transducer of the type described, which transducer has a frequency response which is essentially flat from 0 to 20 Hzs.

Still another objective of the instant invention concerns the provision of a improved transducer which has a high sensitivity enabling the recordation and monitoring of weak arterial pulsations.

Yet another objective of the instant invention concerns the provision of an improved instrument for external recording of arterial pulse waves, which instrument has a high degree of accuracy of the wave form picked up and which instrument has a relative freedom from deleterious noise.

These objects, as well as others which will become apparent as the description proceeds, are implemented by the instant inventive externally-applied arterial pulse wave pressure transducer which, in its general form, will be seen to comprise a fluid-filled cavity having a membrane which closes the cavity and which is adapted to be placed on the skin of a patient over an artery. An arterial pulse wave is thereby transmitted through the membrane whereby pressure pulses are created in the fluid. A pressure-sensitive transistor is disposed in direct contact with the fluid, this transistor transducing the pressure pulses into an electrical signal, which signal can be monitored as representative of the functional status of the artery involved. Further, such signal can readily be recorded, such as on a standard EKG machine so as to provide a permanent record.

As will appear hereinbelow, with respect to the detailed description of a preferred inventive embodiment, the device of the instant invention is extremely simple in construction and in its use, thereby providing a major advance in this field of the medical arts.

BRIEF DESCRIPTION OF THE DRAWINGS

Reference is herein made to the appended single sheet of drawings by which the instant invention will be better understood and further features and advantages thereof will become apparent. In this respect, the single FIGURE of drawings depicts a side elevational view, in section for clarity, of a preferred embodiment of the instant invention.

DETAILED DESCRIPTION OF THE PREFERRED INVENTIVE EMBODIMENT

Reference is herein made to the appended sheet of drawing depicting the preferred embodiment of the novel externally-applied arterial pulse wave transducer. The transducer comprises a housing generally designated by reference numeral 10 which, in the preferred inventive embodiment, constitutes a body of revolution, such as an elongated cylinder. The housing 10 is substantially solid except for various bores and cavities therein as will be described hereinbelow, and is preferably constructed of a plastic material, though other materials providing adequate strength and rigidity can be substituted therefor.

Housing 10 will be seen to include a cavity therein generally designated by reference numeral 12, which cavity is disposed in one end of the housing 10 and is defined by an axial bore of predetermined dimension and depth. The cavity 12 is open towards the outside of housing 10 and is delimited by an internal pressure wall 14. Cavity 12 is adapted to be substantially filled with a fluid, such as water, via a channel 16 through housing 10 communicating with cavity 12, the channel defining a filling port and incorporating means, such as a screw 18, to selectively close the filling port. Specifically, and in the preferred inventive embodiment, fluid is placed into the cavity 12 by removing screw 18 and inserting a hypodermic needle or the like into contact with the channel 16 defining the filling port.

The cavity 12 is closed and thereby hermetically sealed by a flexible membrane member designated by reference numeral 20 disposed over said one end of the housing 10 and removably maintained in place by means of an O-ring 22 disposed in a corresponding groove about the periphery of housing 10. The flexible membrane member 20 is preferably constructed of a thin plastic material, such as Saran, or a thin rubberized material, or the like. The primary requirement of the membrane 20 is that it maintain fluid within the cavity 12 and that it be relatively flexible for reasons as will be described hereinbelow.

Housing 10 includes a further axial bore designated by reference numeral 24 disposed in the other end thereof, axial bore 24 also being of a predetermined depth and dimension, whereby a wall 26 of predetermined thickness is formed between bore 24 and the cavity 12. A semiconductor pressure-sensing means designated by reference numeral 28 is disposed through a further bore in the wall 26 in a fashion so as to be in direct communication with the fluid in cavity 12. Specifically, the semiconductor pressure sensing means 28 comprises a transistor which has a pressure-sensitive casing or diaphragm 30 mechanically coupled to an internal "*pn*" junction therein, such as the emitter-base junction, in a fashion such that pressure variations sensed by the casing or integral diaphragm 30 and transmitted to the "*pn*" junction varies the transistor current gain. Such pressure-sensitive transistors are currently commercially available under the trade name Pitran from Stow Laboratories. The connections to the emitter, base, and collector electrodes of the pressure-sensitive transistor 28 are made by electrical conductors generally designated by reference numeral 32 which lead outside housing 10 to external equipment generally designated by reference numeral 34 through a passage or channel 36 in the housing. Transistor 28 is constructed so as to have vent holes or the like (non-illustrated) on the side of its casing facing the axial bore 24. It should further be appreciated that transistor 28 can be disposed in place through wall 26 by means of a waterproof glue or the like.

The pressure transducing assembly above-described is completed by the provision of an elongated end section member designated by reference numeral 38 which can be constructed of the same material as housing 10, the end section member 38 being attached to one end of housing 10 by means of any suitable fastening mechanism, such as bolts, or such as glue. The elongated end section member 38 incorporates an axial bore 40 therein which, in the preferred inventive embodiment, is internally threaded, as at 42, so as to receive an instrument holder or the like. A channel means 44 is disposed through the elongated end section member 38 and comprises an atmospheric pressure vent between the axial bore 24 and the holes in the casing of transistor 28 so that a pressure differential in excess of atmospheric can be sensed by the transistor 28 via its built-in casing or diaphragm 30.

Operation of the novel external transducer for arterial pulse waves will now be described, and, in this respect, the device is adapted to be clamped or otherwise attached to the skin of a patient over some major artery in a fashion such that the membrane member 20 makes good contact with the patient's skin over the artery. Arterial pulse pressure thereby is transmitted through the flexible membrane member 20 into the fluid maintained within cavity 12 of the housing 10. Since the fluid is substantially incompressible, pressure changes are transmitted therethrough to the pressure-senstive casing 30 of transistor 28 disposed in pressure wall 14 of the cavity. These sensed pressure changes are converted into changes in the electrical characteristics and signals, such as changes in gain of transistor 28 and are transmitted outside housing 10 to external equipment 34 such as an amplifier and/or recording apparatus, whereby such signals can be monitored as representative of arterial pulse pressure. As mentioned at the outset of this specification, the apparatus of the instant invention has been found to operate in a fashion substantially improved over all prior art devices, the provision of the pressure-sensitive transistor 28 effecting the desired flat frequency response, accurate and substantially noise-free wave form reproduction, high sensitivity, and enabling the device to be constructed at low cost and in a compact fashion.

From the foregoing detailed description, it should therefore be apparent that all the objectives initially set forth have been successfully achieved. Moreover, while there has been shown and described a present preferred embodiment of the invention, it is to be distinctly understood by those skilled in the art that the invention is not limited thereto, but may otherwise be variously embodied and practiced within the scope of the appended claims. ACCORDINGLY,

What is claimed is:

1. An arterial pulse wave pressure transducer comprising, in combination, a housing having a fluid-filled cavity therein; a flexible membrane disposed over said cavity for closing same, said membrane being adapted to be placed in contact with the skin of a patient at a location over an artery, said membrane defining means for converting displacements effected by naturally occurring arterial pressure pulsations into corresponding pressure pulses in the fluid within said cavity; semiconductor pressure-sensing means disposed through a wall of said cavity in direct communication with the fluid therein for effecting changes of the electrical characteristics thereof in response to pressure pulses applied thereto; said semiconductor pressure-sensing means comprising a transistor having a pressure-sensitive casing mechanically coupled to a pn junction therein so as to vary the current gain, said casing being disposed through said cavity wall into contact with the fluid therein; and electrical conductors coupled to said semiconductor pressure-sensing means and leading outside said housing to define a means for monitoring changes in said electrical characteristics as representative of arterial pulsations and displacements applied to said flexible membrane.

2. An arterial pulse wave pressure transducer as defined in claim 1, wherein said cavity is disposed in one end of said housing, said flexible membrane being placed over said one end of said housing to seal said cavity.

3. An arterial pulse wave pressure transducer as defined in claim 2, wherein said membrane is removably maintained in place about said one housing end by an O-ring, whereby replacement of said membrane is facilitated.

4. An arterial pulse wave pressure transducer as defined in claim 2, wherein said cavity is defined by an axial bore in said one end of said housing, said housing incorporating a further axial bore in the other end thereof of a predetermined depth whereby a wall of predetermined thickness is formed between both said axial bores, said transistor being disposed in said further axial bore with the casing thereof extending through said wall into contact with said cavity.

5. An arterial pulse wave pressure transducer as defined in claim 4, further including a channel through said housing communicating with said cavity, said channel defining a filling port, and means to selectively close said filling port.

6. An arterial pulse wave pressure transducer as defined in claim 5, further including an elongated end section member attached to said other end of said housing, said elongated end section member having an axial bore therein adapted to receive a holder, and channel means therethrough communicating with said further axial bore of said housing and defining an atmospheric pressure vent.

7. An arterial pulse wave pressure transducer as defined in claim 6, wherein said housing and said elongated end section member are constructed of plastic.

* * * * *